US012001417B2

(12) United States Patent
Pilz et al.

(10) Patent No.: US 12,001,417 B2
(45) Date of Patent: Jun. 4, 2024

(54) DATA LOCKING

(71) Applicant: SAP SE, Walldorf (DE)

(72) Inventors: Richard Pilz, Dresden (DE); Adrian Mocan, Dresden (DE); Katja Pfeifer, Dresden (DE); Tom Spiegler, Dresden (DE)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 17/467,367

(22) Filed: Sep. 6, 2021

(65) Prior Publication Data

US 2021/0397597 A1 Dec. 23, 2021

Related U.S. Application Data

(63) Continuation of application No. 15/875,353, filed on Jan. 19, 2018, now Pat. No. 11,113,261.

(51) Int. Cl.
*G06F 16/23* (2019.01)
*G06F 16/22* (2019.01)
*G06F 16/2457* (2019.01)

(52) U.S. Cl.
CPC ...... *G06F 16/2343* (2019.01); *G06F 16/2264* (2019.01); *G06F 16/2365* (2019.01); *G06F 16/2457* (2019.01)

(58) Field of Classification Search
CPC ............. G06F 16/2343; G06F 16/2264; G06F 16/2365; G06F 16/2457
See application file for complete search history.

(56) References Cited

U.S. PATENT DOCUMENTS 5,742,813 A * 4/1998 Kavanagh ........... G06F 16/2308 706/50
6,658,413 B1 * 12/2003 Reddy ................. G06F 16/2343 707/999.009
8,452,743 B2 * 5/2013 Vasudevan ........... G06F 16/282 707/704
9,171,019 B1 * 10/2015 Donlan ............... G06F 16/2343
10,346,385 B2 * 7/2019 Barsness ............. G06F 16/2343
2008/0086470 A1 * 4/2008 Graefe ................ G06F 16/2343
2009/0282043 A1 * 11/2009 Dharmavaram .... G06F 16/2343
2016/0092498 A1 * 3/2016 Helak ..................... G06F 16/21 707/704

FOREIGN PATENT DOCUMENTS

CN 110537174 A * 12/2019 ........... G06F 16/221
CN 110537174 B * 9/2022 ........... G06F 16/221
EP 1335305 A2 * 8/2003 ....... G06F 17/30362

* cited by examiner

*Primary Examiner* — Dennis Truong
(74) *Attorney, Agent, or Firm* — Buckley, Maschoff & Talwalkar LLC

(57) ABSTRACT

A system and method to query, update, and reduce a size of locking data for a dataset including a fixed plurality of dimensions each having a fixed plurality of members comprising index tables for the dimensions and a locks table specifying one of a fixed plurality of lock states for the plurality of members, where the fixed plurality of members each have an associated index.

9 Claims, 12 Drawing Sheets

1100

1105 RECEIVE A REQUEST TO SET A LOCK STATE FOR A COMBINATION OF AT LEAST TWO MEMBERS OF A DATASET

1110 SPLIT THE LOCKS TABLE TO ENSURE THE AT LEAST TWO MEMBERS OF THE REQUEST HAVE AN INDEX OTHERWISE UNUSED BY OTHER MEMBERS IN A FIRST DIMENSION AND THE LOCK STATE FOR THE AT LEAST TWO MEMBERS OF THE REQUEST IS UNCHANGED

1115 AMEND, SUCCESSIVELY BY THE PROCESSOR, THE LOCKS TABLE TO ENSURE THE AT LEAST TWO MEMBERS OF THE REQUEST HAVE AN INDEX OTHERWISE UNUSED BY OTHER MEMBERS IN A NEXT DIMENSION AND THE LOCK STATE FOR THE AT LEAST TWO MEMBERS OF THE REQUEST IS IN THE NEXT DIMENSION UNCHANGED

1120 UPDATE A LOCK STATE OF THE AMENDED LOCKS TABLE FOR THE COMBINATION OF THE AT LEAST TWO OF MEMBERS OF THE REQUEST

1125 STORE THE UPDATED LOCKS TABLE IN A MEMORY

| Member | Index |
| --- | --- |
| 2016 | 1 |
| 2017 | 1 |
| 2018 | 2 |

| Member | Index |
| --- | --- |
| USA | 1 |
| Germany | 2 |
| France | 3 |

| Member | Index |
| --- | --- |
| Shoes | 1 |
| Hats | 3 |
| Caps | 1 |

| | Time Index | Country Index | Product Index | Lock State |
| --- | --- | --- | --- | --- |
| 1 | 1 | 1 | 1 | Locked |
| 2 | 1 | 2 | 1 | Locked |
| 3 | 1 | 3 | 3 | Restricted |

505

| Member | Index |
|---|---|
| 2016 | ***3*** |
| 2017 | 1 |
| 2018 | 2 |

*FIG. 5*

| | Time Index | Country Index | Product Index | Lock State |
|---|---|---|---|---|
| 1 | 1 | 1 | 1 | Locked |
| 2 | 1 | 2 | 1 | Locked |
| 3 | 1 | 3 | 3 | Restricted |
| ***4*** | ***3*** | ***1*** | ***1*** | ***Locked*** |
| ***5*** | ***3*** | ***2*** | ***1*** | ***Locked*** |
| ***6*** | ***3*** | ***3*** | ***3*** | ***Restricted*** |

| Member | Index |
| --- | --- |
| Shoes | 1 |
| Hats | 3 |
| Caps | *4* |

FIG. 7

| | Time Index | Country Index | Product Index | Lock State |
| --- | --- | --- | --- | --- |
| 1 | 1 | 1 | 1 | Locked |
| 2 | 1 | 2 | 1 | Locked |
| 3 | 1 | 3 | 3 | Restricted |
| 4 | 3 | 1 | 1 | Locked |
| 5 | 3 | 2 | 1 | Locked |
| 6 | 3 | 3 | 3 | Restricted |
| ***7*** | ***1*** | ***1*** | ***4*** | ***Locked*** |
| ***8*** | ***1*** | ***2*** | ***4*** | ***Locked*** |
| ***9*** | ***3*** | ***1*** | ***4*** | ***Locked*** |
| ***10*** | ***3*** | ***2*** | ***4*** | ***Locked*** |

| | Time Index | Country Index | Product Index | Lock State |
|---|---|---|---|---|
| 1 | 1 | 1 | 1 | Locked |
| 2 | 1 | 2 | 1 | Locked |
| 3 | 1 | 3 | 3 | Restricted |
| 4 | 3 | 1 | 1 | Locked |
| 5 | 3 | 2 | 1 | Locked |
| 6 | 3 | 3 | 3 | Restricted |
| 7 | 1 | 1 | 4 | Locked |
| 8 | 1 | 2 | 4 | Locked |
| 9 | 3 | 1 | 4 | Locked |
| ***10*** | *(removed)* | | | |

| | Time Index | Country Index | Product Index | Lock State |
|---|---|---|---|---|
| 1 | 1 | 1 | 1 | Locked |
| 2 | 1 | 2 | 1 | Locked |
| 3 | 1 | 3 | 3 | Restricted |
| 4 | 3 | 1 | 1 | Locked |
| 5 | 3 | 2 | 1 | Locked |
| 6 | 3 | 3 | 3 | Restricted |
| 7 | 1 | 1 | 4 | Locked |
| 8 | 1 | 2 | 4 | Locked |
| 9 | 3 | 1 | 4 | Locked |
| 10 | 3 | 2 | 4 | ***Restricted*** |
| ***11*** | ***3*** | ***3*** | ***4*** | ***Restricted*** |

*FIG. 10*

| Member | Index |
|---|---|
| USA | 1 |
| Germany | 1 |
| France | 3 |

*FIG. 12*

| | Time Index | Country Index | Product Index | Lock State |
|---|---|---|---|---|
| 1 | 1 | 1 | 1 | Locked |
| *3* | *(removed)* | | | |
| 3 | 1 | 3 | 3 | Restricted |

| | Time Index | Country Index | Product Index | Lock State |
|---|---|---|---|---|
| 1 | 1 | 1 | 1 | Locked |
| 2 | 1 | 1 | 2 | Locked |
| 3 | 1 | 1 | 3 | Restricted |
| 4 | 1 | 2 | 3 | Restricted |
| 5 | 1 | 2 | 2 | Locked |
| 6 | 1 | 2 | 1 | Locked |

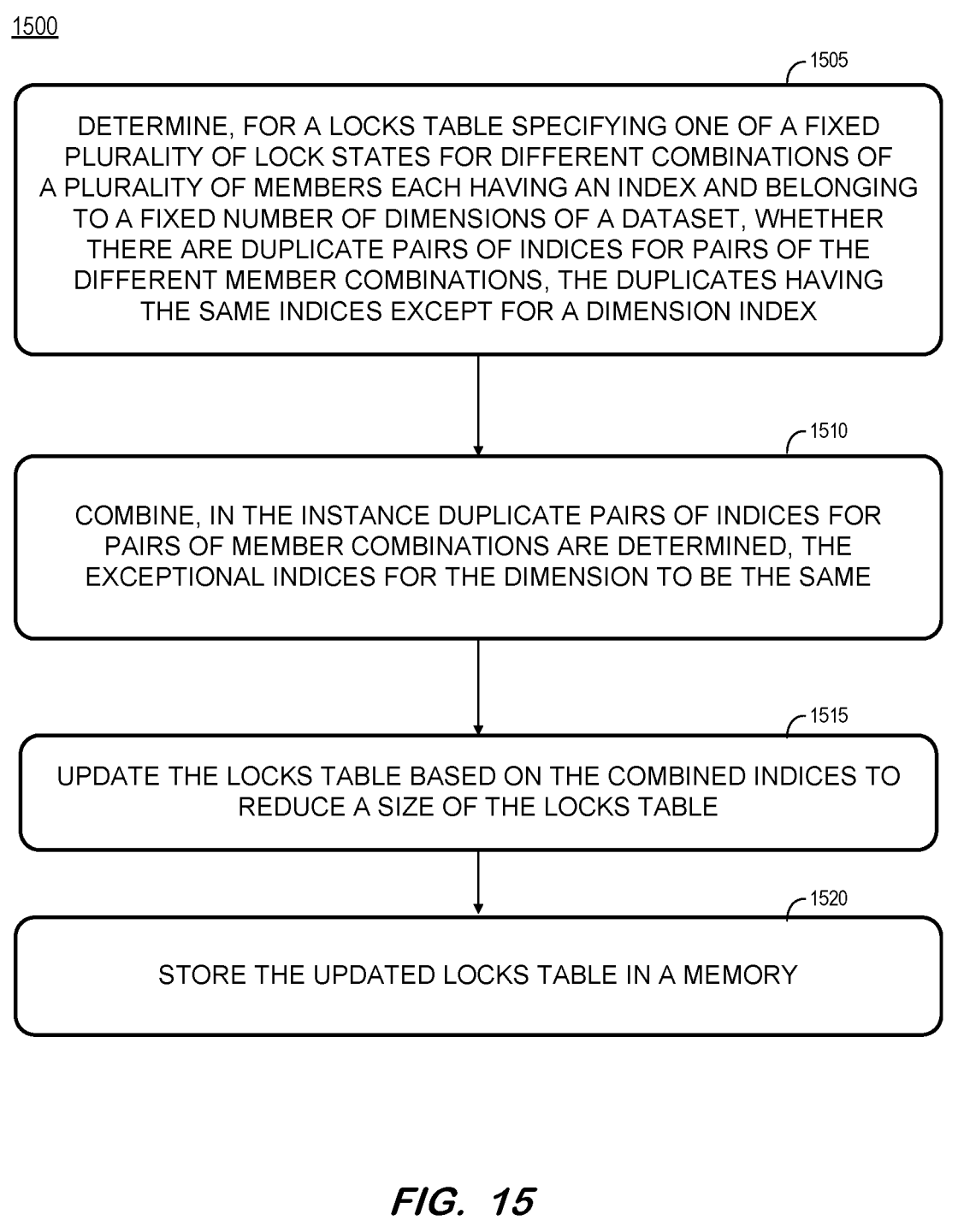

DETERMINE, FOR A LOCKS TABLE SPECIFYING ONE OF A FIXED PLURALITY OF LOCK STATES FOR DIFFERENT COMBINATIONS OF A PLURALITY OF MEMBERS EACH HAVING AN INDEX AND BELONGING TO A FIXED NUMBER OF DIMENSIONS OF A DATASET, WHETHER THERE ARE DUPLICATE PAIRS OF INDICES FOR PAIRS OF THE DIFFERENT MEMBER COMBINATIONS, THE DUPLICATES HAVING THE SAME INDICES EXCEPT FOR A DIMENSION INDEX

1510

COMBINE, IN THE INSTANCE DUPLICATE PAIRS OF INDICES FOR PAIRS OF MEMBER COMBINATIONS ARE DETERMINED, THE EXCEPTIONAL INDICES FOR THE DIMENSION TO BE THE SAME

1515

UPDATE THE LOCKS TABLE BASED ON THE COMBINED INDICES TO REDUCE A SIZE OF THE LOCKS TABLE

1520

STORE THE UPDATED LOCKS TABLE IN A MEMORY

*FIG. 15*

DATA LOCKING

BACKGROUND

A database management system may include data in many thousands and even millions of data tables. The organization and management of the many tables and other data structures requires many coordinated efforts and resources. Oftentimes, there is an on-going concern about providing access to certain data, where access to the data may include an ability to change the data. For data management systems and processes that might include some type of data locking mechanism, one or more processes and data structures may have to be used to implement the data locking mechanisms.

One problem that might be encountered in a method and/or system using a data locking mechanism is the amount of computing resources and time required to implement such mechanisms. That is, in addition to the memory and processing requirements of the operational data of an organization, the method and/or system using the data locking mechanism may further use the computing resources of the organization.

In some contexts, there may exist a desire to more efficiently perform data locking operations, while conserving system resources and accurately maintaining data access privileges.

BRIEF DESCRIPTION OF THE DRAWINGS

FIG. 5 is an illustrative example of an index table for a dimension in an example embodiment;

FIG. 6 is an illustrative example of a locks table for an UPDATE process in an example embodiment;

FIG. 7 is an illustrative example of an index table of a dimension for an UPDATE process in an example embodiment;

FIG. 8 is an illustrative example of a locks table for an UPDATE process in an example embodiment;

FIG. 9 is an illustrative example of a final locks table for an UPDATE process in an example embodiment;

FIG. 10 is an illustrative example of a final locks table for an UPDATE process in another example embodiment;

FIG. 12 is an illustrative example of an index table in an example embodiment;

FIG. 13 is an illustrative example of a locks table for a REDUCE process in an example embodiment;

FIG. 14 is an illustrative example of a locks table for an REDUCE process in another example embodiment;

FIG. 15 is a flow diagram of a process in an example embodiment; and

DETAILED DESCRIPTION

The following description is provided to enable any person in the art to make and use the described embodiments. Various modifications, however, will remain readily apparent to those in the art.

Generally, according to some embodiments, a client application may access, delete, modify, and otherwise use data upon connection to a remote data source. In one example use case, the application may be a financial application that uses different financial data. The financial data may be stored in a database comprising data tables including a fixed set of dimensions, where each dimension has a fixed set of members. A customer or other user of the client application may enter data for different dimensions of the financial data (i.e., the dataset). Some examples of dimensions for the dataset of the present example can include a Product dimension, a Country dimension, a Time dimension, and other dimensions for categorizing the financial data. In some embodiments herein, a data locking mechanism provides access control to the dataset by specifying a limited number of lock states for the data. In some aspects, the data locking mechanism herein may prevent an entity from accessing or changing the data. For example, data could be locked for a particular combination of members (e.g., Germany, 2016) of certain dimensions (e.g., Country, Time) so that a user of the client application might be prevented from adding, deleting, or otherwise changing data for the specified combination of members in the dataset. In addition to providing access control, the data locking mechanisms herein are stored in some memory so that they may, for example, be used in further processing of the data. Technical aspects of the present disclosure further include storing the data locking mechanisms herein in an efficient manner.

Storing every possible combination of lock states for the members of the dimensions of a dataset may be too storage intensive for some practical purposes given the fact that datasets for an organization might include tens of thousands of members for each dimension in the dataset. In some embodiments, a solution herein is to assign an index to every member of a dimension and store the combination of such indices to specify the lock state for the combination, thereby reducing the storage requirements for locking data for the combination. As used herein, a combination of indices of members of a dataset is referred to as a "slice" of the dataset. The locking mechanisms and aspects thereof disclosed herein may be applied to many different use-cases, including those that use large dimensions.

Figure 1:
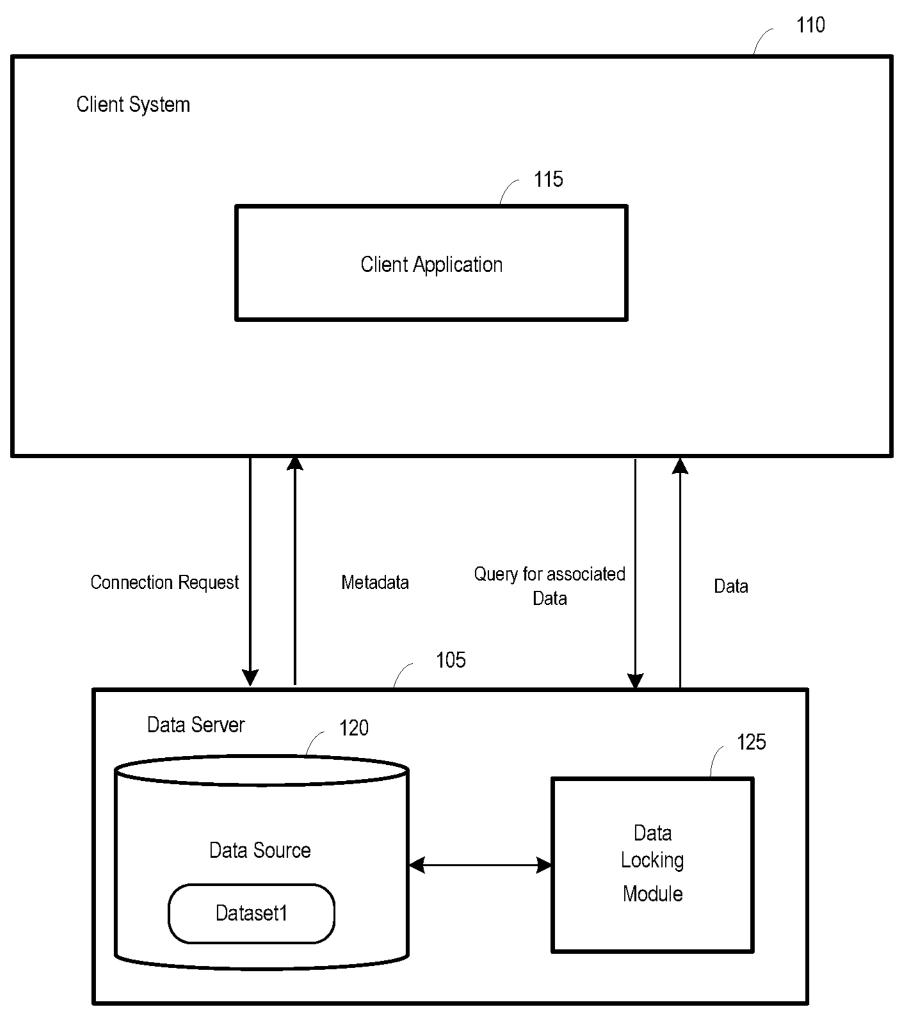
FIG. 1 is an illustrative block diagram of an example of a system architecture according to some embodiments.

FIG. 1 is a block diagram of system 100 according to some embodiments. Embodiments are not limited to the FIG. 1 system. System 100 includes data server 105 and client system 110. Data server 105 may be embodied in a backend system and may communicate with client system 110 over any number of intermediate public or private networks, including but not limited to the World Wide Web.

Client system 110 may execute client application 115 to generate and display different data visualizations, reports, analytics, etc. For example, client system 110 may execute client application 115 to access, change, and otherwise use data in a database 120 of data server 105. The user operates a user interface to send a connection request to data server 105. The connection request may comprise a request to connect to dataset Dataset1 of data source 120.

According to some embodiments, data server 105 returns data associated with Dataset1 to client system 110 in response to a data query or other request. The returned data are mapped to logical entities of Dataset1 and may be classified as dimensions, along which one may want to perform an analysis or report (e.g., Year, Country, Product) or measures (e.g., Sales, Profit), whose values can be determined for a given combination of dimension values.

A data locking module 125 may operate to implement data locking mechanisms, features, and optimizations as will be described in greater detail below. Data locking (DL) module 125 may be embodied in a combination of hardware and software components that cooperatively operate to effectuate some of the processes disclosed herein. Data locking module 125 may generate, maintain, and update a locks table 130 that specifies a lock state for different combinations of members of the data (i.e., Dataset1).

Client system 120 may comprise any suitable computing device capable of executing client application. Client system 120 may comprise, for example, a desktop computer, a laptop computer, a tablet computer, or a smartphone. Client application 115 may comprise a financial operations application, but embodiments are not limited thereto.

Data server 110 may also comprise any query-responsive data server that is or become known, including but not limited to a structured-query language (SQL) relational database management system. Data server 110 may comprise any one or more data sources which are or become known, including but not limited to database views, spreadsheets, relational databases and/or OnLine Analytical Processing cubes. The data sources of data server 105 may be distributed among several relational databases, dimensional databases, and/or other data sources. Embodiments are not limited to any number or types of data sources.

In some embodiments, data source 120 may comprise one or more of conventional tabular data, row-based data, column-based data, and object-based data. Moreover, the data may be indexed and/or selectively replicated in an index to allow fast searching and retrieval thereof. Data server 105 may support multi-tenancy to separately support multiple unrelated clients by providing multiple logical database systems which are programmatically isolated from one another.

Data source 120 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database). A hardware processing system implementing database server 105 (e.g., a server blade) may be physically integrated with or separate from a hardware storage system (e.g., a fixed disk array, volatile Random Access Memory) implementing data source 120.

In some embodiments, data stored in a database system (e.g., 100) might encode/compressed according to a particular compression process. In some embodiments, a database system herein may include an in-memory database system such as, for example, SAP HANA developed and owned by the assignee of the present disclosure.

In some embodiments, a dataset herein may be assumed to comprise a set D of dimensions, a set Md of members for each dimension d ED, and a set S of lock states. In some embodiments, S={Open, Restricted, Locked}. In some embodiments, fewer, additional, or other lock states may be specified. Additionally, the following tables may be maintained (as described by their partial lookup functions):

For each dimension $d \in D$, a table $I_d$: $M_d \rightarrow \mathbb{N}$ (herein, an index table).

A table L: $\Pi_{d \in D}\mathbb{N} \rightarrow S$ (herein, a locks table).

This describes a function state: $\Pi_{d \in D} M_d \rightarrow S$ as follows:

$$\text{state}(t) := L(t'), t' = (Id(td))|_{d \in D}$$

for each tuple $t \in \Pi_{d \in D} M_d$.

For a member $m \in M_d$, an index $I_d(m)$ is referred to herein as the index of m. Furthermore, a tuple $t \in \Pi_{t \in D}\mathbb{N}$ is referred to herein as a slice and refer to L(t) as the lock state of the slice t.

Initially in some embodiments, every member of every dimension gets index 1 and the locks table contains a single entry that maps the tuple with 1 for every dimension to a default lock state $s_{def}$.

Figure 2:
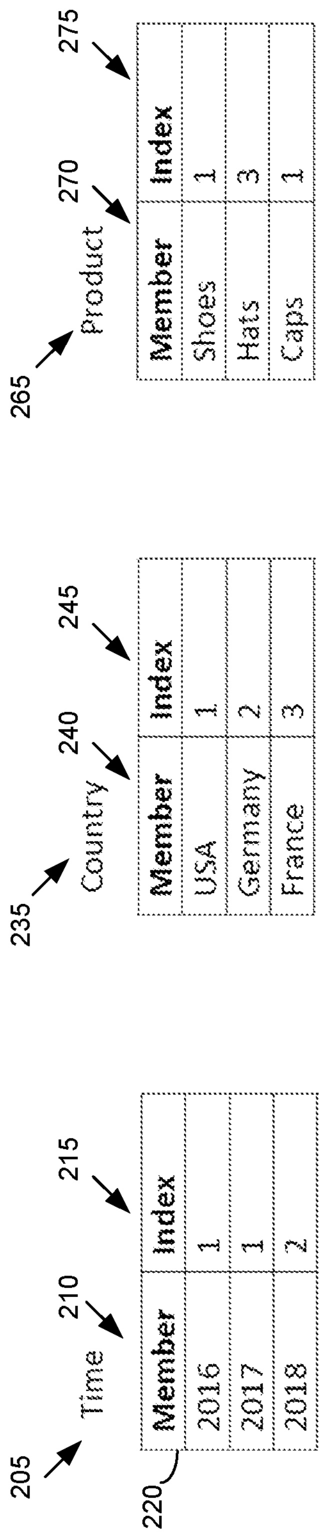
FIG. 2 is an illustrative depiction of example index tables of a dataset according to some embodiments.
Figure 3:
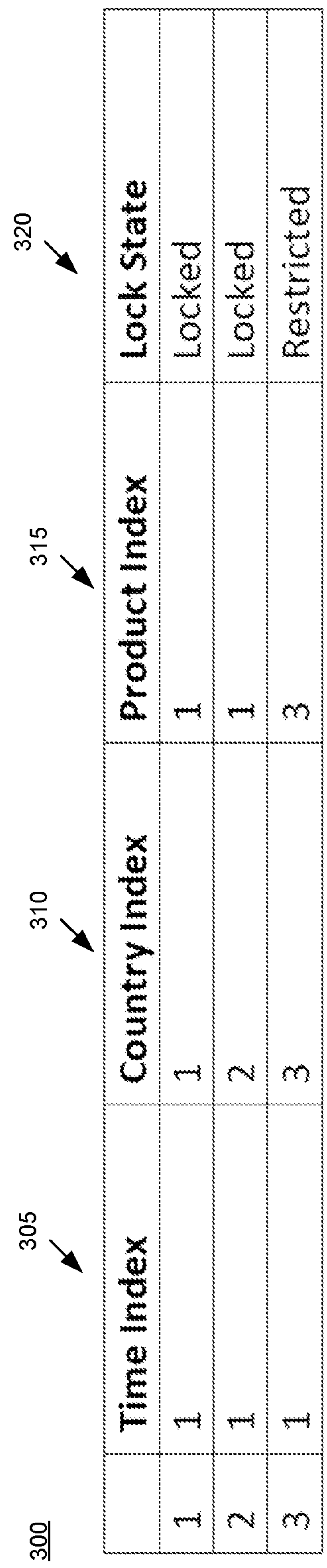
FIG. 3 is an illustrative depiction of an example locks table according to some embodiments.

A sample dataset may include and be represented by the example index tables in FIG. 2 and a locks table depicted in FIG. 3. The dataset includes the dimensions of Time, Country, and Product, where each dimension includes a set of members. An index table for the dimension Time is shown at 205, an index table for the dimension Country is shown at 240, and an index table for the dimension product is shown at 265. The Time index table includes a column 210 for the members of the dimension and a column 215 for the index for each member of the dimension. The Country index table 235 includes a column 240 for the members of the dimension and a column 245 for the index for each member of the dimension. The Product index table 265 includes a column 270 for the members of the dimension and a column 275 for the index for each member of the dimension.

FIG. 3 is an illustrative example of a locks table 300 for the dimensions of FIG. 2. Locks table 300 includes columns 305, 310, and 315 for the indices of the three dimensions and a lock state column 320. The lock state listed in column 320 specifies the lock state for the combination of indices indicated in each row of the locks table (e.g., rows 1, 2, and 3).

Referring to the locks table of FIG. 3, the first row in locks table 300 specifies that all combinations of all times with index 1 and all countries with index 1 and all products with index 1 are locked. That is, in the present example the following combinations of members are all locked: (2016, USA, Shoes), (2017, USA, Shoes), (2016, USA, Caps), and (2017, USA, Caps). As used herein, a "locked" state for a particular combination means it is not possible to change data for that particular combination.

Referring to the second row of locks table 300, all of the combinations of all times with index 1 and all countries with index 2 (i.e., Germany, per index table 235 in FIG. 2) and all products with index 1 are locked. For the second row, the following combinations are all locked: (2016, Germany, Shoes), (2017, Germany, Shoes), (2016, Germany, Caps), and (2017, Germany, Caps). The third row of locks table 300 specifies that the member combinations of (2016, France, Hats) and (2017, France, Hats) are "Restricted". As used herein, a lock state of "Restricted" means that only some users can change the data.

In some embodiments, including the example of locks table 300 shown in FIG. 3, all other combinations not specifically listed in the locks table (e.g. (2016, Germany, Hats) or any combination for 2018) are assumed to have a default lock state. For the locks table of FIG. 3, the default lock state is "Open", which means that the data can be accessed and changed by all users.

In some embodiments, the algorithms for the index tables and the locks table may be implemented in SQL, a declarative, data-oriented language.

As discussed above, some embodiments herein need an index table per dimension and one locks table. The index tables contain a column holding the member identifier and a column holding the index. The locks table contains a column for every dimension (holding indices) and a column for the lock state (e.g., stored as TINYINT). The primary keys of the index tables are the member identifiers, the primary key of the locks table consists of the indices of all dimensions. In some embodiments, the requisite index tables and locks table can be created with the following SQL statements.

Index tables can be created for each dimension as follows, where while <dimension> is replaced by the dimension's name:

```
CREATE TABLE locks_index_<dimension> (
  member VARCHAR(100) PRIMARY KEY,
  index BIGINT
);
```

The locks table may be created by the following SQL statement, which is executed once and where <dimension 1> is replaced by the name of the first dimension, <dimension 2> by the name of the second dimension, and so on.

```
CREATE TABLE locks (
    index_<dimension 1> BIGINT,
    index_<dimension 2> BIGINT,
    ...,
    index_<dimension n> BIGINT,
    state TINYINT,
  PRIMARY KEY (index_<dimension 1>, ..., index_<dimension n>)
);
```

In some embodiments, to generate fresh indices, a sequence for each dimension is used. The following statement is executed for each dimension with <dimension> being replaced by the dimension's name.

```
CREATE SEQUENCE locks_seq_<dimension> START WITH 2;
```

In some aspects, the index tables are initialized with all members. Each member has index 1 initially. The locks table is empty initially.

A number of operations or functions may be performed on a dataset defined by the foregoing preliminary assumptions, including the index tables and locks table as defined above. In some embodiments, a query may be executed to determine a lock state for a particular combination of members of the set of dimensions of a dataset. The query process may be defined by the following.

Given $t \in \Pi_{d \in D} M_d$ find state(t). The following algorithm describes a query operation herein.

```
function QUERY(t)
  for all d ∈ D do
    t'_d ← I_d(t_d)
  end for
  result ← L(t')
  return result
end function
```

The query operation to determine the lock state of a particular combination of members of the set of dimensions may be further understood by referring to the sample dataset including and represented by the example index tables in FIG. 2 and the locks table depicted in FIG. 3. In one example, a query to determine whether data can be entered for the combination of (2016, Germany, Caps) may be executed. A Query process may look up the index for each member in the combination in the respective index table for the dimension. Accordingly, 2016 has an index 1, Germany has index 2, and Caps has index 1. Next, the Query process looks for this particular combination of indices (1, 2, 1) in the locks table 300. The combination of (1, 2, 1) is located in the second row of locks table 300 and the lock state is "Locked". Accordingly, the combination specified in the query is locked and entering data is disallowed.

Figure 4:
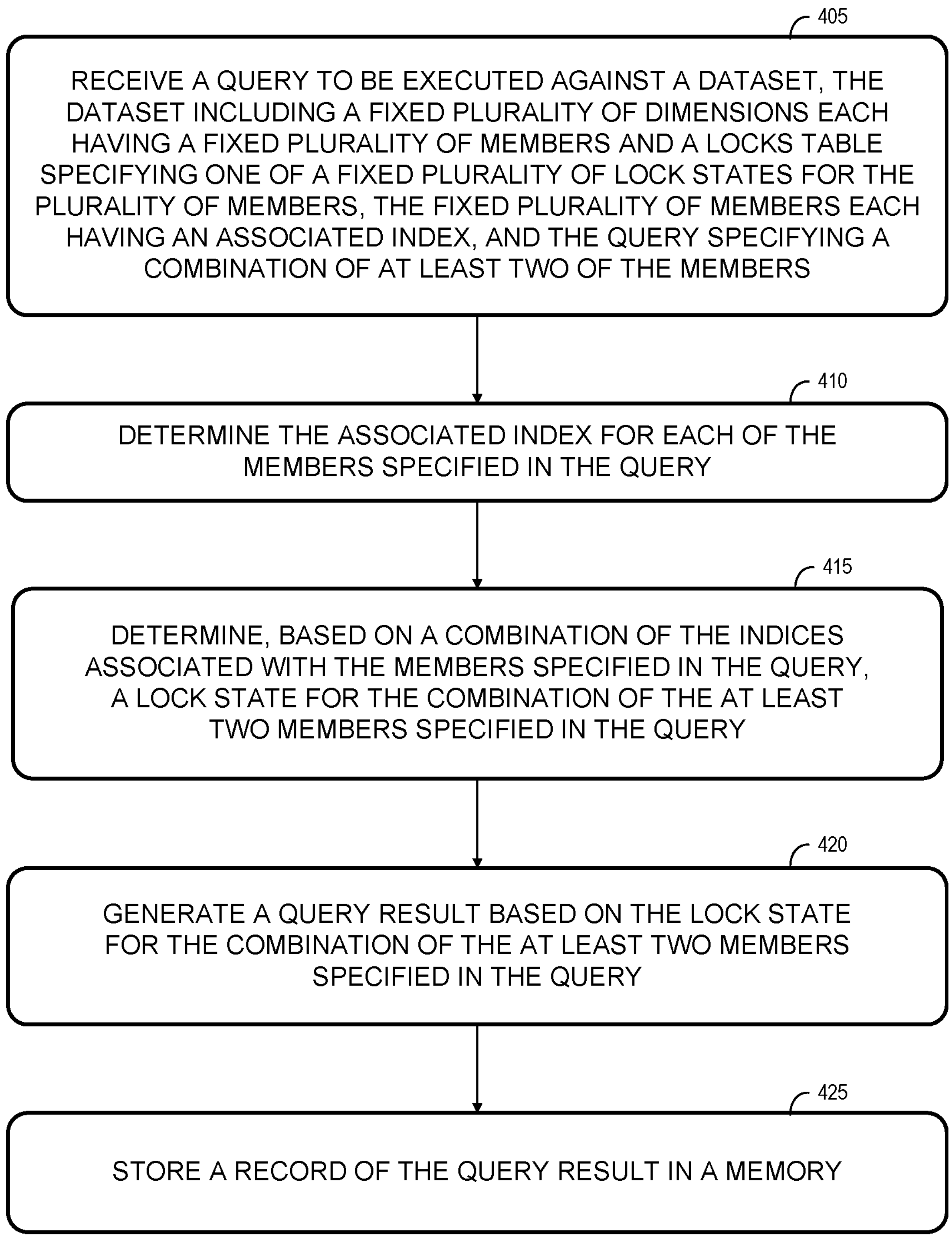
FIG. 4 is a flow diagram of a process in an example embodiment.

FIG. 4 is an illustrative flow diagram of a query process herein leveraging the index tables and locks table also disclosed herein. The query request may ask or depend on determining the lock state for a combination of members of the dataset. At operation 405, a query is received. The query relates to a data set defined as disclosed herein. In particular, the dataset can include a fixed plurality of dimensions each having a fixed plurality of members and a locks table specifying one of a fixed plurality of lock states for the plurality of members, the fixed plurality of members each having an associated index and represented in index tables for each of the dimension. Additionally, the query specifies a combination of at least two of the members.

At operation 410, a determination is made of the associated index for each of the members specified in the query request. Having determined the associated index for each of the members specified in the query request at operation 410, operation 415 determines, based on a combination of the indices associated with the members specified in the query, a lock state for the combination of the at least two members specified in the query. The lock state is obtained from the locks table associated with the dataset.

Proceeding to operation 420, a query result is generated based on the lock state for the combination of the at least two members specified in the query. In some aspects, a record of the query result may be stored in a memory for further processing, including but not limited to reporting, archiving, analysis, and other actions.

In some embodiments, a query operation may be implemented as a boolean condition usable in a SQL WHERE block. Instead of looking up the index for each member individually, the locks table can be joined with all index tables at once. For example, for dimensions D={dimA, dimB} with members $a \in M_{diMA}$, $b \in M_{dimB}$ the following conditional would evaluate to true, if the lock state of the tuple (a, b) is Locked. It is assumed that Locked is stored as 0.

```
EXISTS (SELECT * FROM locks
  JOIN locks_index_dimA
    ON locks.index_dimA = locks_index_dimA.index
    AND locks_index_dimA.member = 'a'
  JOIN locks_index_dimB
    ON locks.index_dimB = locks_index_dimB.index
    AND locks_index_dimB.member = 'b'
  WHERE locks.state = 0)
```

However, the above implementation might be inefficient because a SQL engine may try to create the full join before filtering for the individual member, thus creating a huge intermediate table. To avoid this scenario, the join can be written differently to induce another execution plan for the query. Improved results were achieved with the following type of join in some system or platform implementations:

```
JOIN (SELECT DISTINCT index FROM locks_index_dim A
    WHERE member = 'a') a
  ONlocks.index dimA = a.index
```

In some embodiments, an Update operation or function may be executed to update or change multiple combinations of members at once. For example, one might want to update combinations including the members Germany, France, 2016, and 2018 so that every combination including Germany, France, 2016, and 2018 is "restricted". The update process may be defined by the following.

Given $u=(u_d)|_{d\in D}, \in P(M_d)$ and $s\in S$, update all tables to describe a new function state': $\Pi_{d\in D}M_{d\to S}$ such that $$\text{state}'(t) = \begin{cases} s & \text{if } t \in \prod_{d\in D} u_d \\ \text{state }(t) & \text{otherwise} \end{cases}$$

where state refers to before the update.

An algorithm for the Update function may be represented as follows:

```
procedure UPDATE(u, s)
  for all d ∈ D do
    is_d ← { }
    for all i ∈ INDICES_d(u_d) do
      i' ← SPLIT_d(u_d, i)
      is_d ← is_d ∪ {i'}
    end for
  end for
  for all t ∈ Π_{d∈D} is_d do
    UPDATE_LOCK(t, s)
  end for
end procedure
```

According to the above, the Update procedure is to update the state for u, a tuple of sets of members (one set for each dimension). The indices used by the set of members are determined. The dimensions are "split" on the members for each of the indices to get new indices. After all of the dimensions have been split, the locks table is updated to include the new lock state for the specified combination of members.

The update function described above uses the helper functions indices$_d$, split$_d$, and UPDATE_LOCK. Here, indices$_d$ returns the set of all indices of the given members of dimension d and UPDATE_LOCK updates the lock state of a given slice to the given value. An implementation of the indices$_d$ and UPDATE_LOCK helper functions are given below.

```
  function INDICES_d(u)
    is ← { }
    for all m ∈ u do
      is ← is ∪ {I_d(m)}
    end for
    return is
  end function
and
  procedure UPDATE_LOCK(t, s)
    L(t) ← s
  end procedure
```

In some aspects, the split$_d$ function is to give all members of the given set of members, that have the given index, a new and otherwise unused index, without changing the state function. The split$_d$ function returns the new index. An illustrative implementation is listed below.

```
function SPLIT_d(u, l)
  i' ← FRESH_d
  for all m ∈ u do
    if I_d(m) = i then
      I_d(m) ← i'
    end if
  end for
  for all t ∈ LOCKS_d(i) do
    L(t[d/i']) ← L(t)
  end for
  return i'
end function
```

The function FRESH$_d$ is a parameterless function that returns an unused index for dimension d. LOCKS$_d$ returns all slices t for which L(t) is defined and which have the given index at dimension d. The notation t[d/i'] describes the tuple t with the index at dimension d replaced by i' (i.e., the new index value).

As introduced above, the UPDATE provides a mechanism to change the locking data for a dataset. The UPDATE process will now be further illustrated by an example, referring again to the index tables of FIG. 2 and the locks table of FIG. 3. In this example, we want to allow entering data for the combination of (2016, Germany or France, Caps) by setting its lock states to Open. As introduced above, the first part of the UPDATE algorithm function is to call the Split algorithm for each dimension. As used herein, to "split" some members of a dimension means to ensure that all of these members have an index not shared with any other members of the dimension.

Accordingly, the Time dimension is first split for member 2016. This member has index 1 as seen in FIG. 2, row 220 that is also shared with other members of the Time dimension (namely, 2017). As such, member 2016 needs a new index (e.g., 3) that is otherwise not used for any other members in the Time dimension. Therefore, the index table for the Time dimension is updated by setting the index for 2016 to 3, as illustrated in FIG. 5 in index table 505.

Due to the update of the index table for the Time dimension, each entry in the locks table (FIG. 3) that refers to index 1 for the Time dimension (i.e., the old index) has to be duplicated to also refer to index 3 (i.e., the new index). This change affects all rows of the locks table (i.e., rows 1, 2, and 3). FIG. 6 is an illustrative example of the locks table updated to accommodate the new index for the Time dimension. Locks table 600 includes duplicates of the rows 1, 2, and 3 from locks table 300 in FIG. 3 as rows 4, 5, and 6, but with the old index 1 replaced with the new index 3 for the Time index.

The splitting of the Time dimension is now complete since only one member of the Time dimension was included in the combination of members to be updated. It is noted that all combinations of members have the same lock state as before, only that 2016 (the member to be updated) now has an isolated index. Additionally, the new index 3 is remembered.

Next, the Country dimension is split for Germany and France. These members have indices of 2 and 3, respectively, both of which are not shared by any other countries. As such, no new indices have to be assigned for these members. Note however that if new index assignments were needed (i.e., if index 2 and 3 were shared with other members in the Country dimension), then each of these members would get assigned a different new index since they have different indices before the split (i.e., different old indices). The old indices 2 and 3 are remembered for the Country index.

Next, the Product dimension is split for the member Caps. This member has index 1, as shown in FIG. 2, index table 260. The index 1 is also shared with Shoes in the Product dimension. Accordingly, a new index (e.g., 4) has to be assigned to Caps. FIG. 7 shows the new index table 705 that includes the new index 4 for Caps. The locks table has to be further updated to accommodate the new index for the Product dimension. All locks referring to the old index 1 for the Product index (i.e., rows 1, 2, 4, and 5) are duplicated but refer to the new index 4. FIG. 8 includes the duplicates of rows 1, 2, 4, and 5 as rows 7-10 with the new index 4. No lock states have been changed for any of the combinations of members. For rows 7-10, no lock states have been changed, but Caps now has an isolated (i.e., unique) index. The new index 4 for the Product dimension is remembered.

Now that all of the dimensions have been split, all locks can be updated with the new lock state, that refer to one of the remembered indices. It is noted that 3 was remembered for the Time dimension, 2 and 3 for the Country dimension, and 4 for the Product dimension (i.e., the combination of (3, 2 and 3, 4). The only relevant entries (i.e., entries including any of these combinations) is row 10. Since the goal of the present UPDATE process is to set the new lock state Open for the combination of (2016, Germany or France, Caps) and the lock state "Open" is the default state (assuming the default state optimization is applied), row 10 is deleted from the locks table. FIG. 9 is an illustrative locks table, where entries for row 10 have been removed.

Referring to FIG. 9, it is noted that all of the listed combinations have the same lock state as before, except the combinations of (2016, Germany, Caps) and (2016, France, Caps) are no longer present. This indicates their lock state is Open, as intended.

As a further example, if the lock state for (2016, Germany or France, Caps) were to be updated to Restricted instead of Open, then the lock state of row 10 (2016, Germany, Caps) would have to be changed to Restricted and a new row would have to be inserted for the combination 3, 3, 4 (i.e., (2016, France, Caps)) with the lock state set to Restricted since there was no row for this combination present before (i.e., this member combination was initially Open). FIG. 10 includes a locks table 1005 for this further example, including a row 11 for the combination of (2016, France, Caps) where the lock state of rows 10 and 11 is set to Restricted, as intended.

In some aspects, the tables for the Update process are quite involved, even for the rather simple examples above. However, a technical advantage of the approach presented herein comes from the fact that a large number of members can have the same index. In some use cases it may be common or frequently that the lock state of many members will be set at once (e.g., for all products). Accordingly, the corresponding locks table can remain small even when many members are involved.

In some embodiments, the splitting algorithm as specified hereinabove (1) queries all indices assigned to a set of members and then (2) does a $split_d$ for each index, which then needs all members with that index assigned. These two operations can be unified by a more advanced $splitall_d$ function that is called with a set of members and then assigns a new index to each of these members such that the members get the same new index if and only if they had the same index before. Additionally, members can keep their index if this index is not used by members not belonging to the given set. The $splitall_d$ function returns the set of all indices now used by the given members.

In some embodiments, the splitting function can be implemented with a series of SQL statements. It is assumed that the set of members is given by a (temporary) table member_names with a single member column for the member identifier. Also, in the following examples it is assumed that the dimension is named dim and that all other dimensions are named dim1, dim2, . . . , dimN.

First, the index is queried for each member:

```
members = SELECT a.member, b.index
  FROM :member_names a
  JOIN locks_index_dim b ON a.member = b.member;
```

Then, all distinct indices used in members are needed. Additionally, a count is made of how often each index is used, as well as how often each index is used overall.

```
member_indices = SELECT index, count(*) cnt
  FROM :members
  GROUP BY index;
all_indices = SELECT index, count(*) cnt
  FROM locks_index_dim
  GROUP BY index;
```

Now, an index mapping is computed that specifies which index is mapped to which new index. The new index is equal to the old index if it is only used by members in member_names. This is the case if and only if the count of this index in member_ids is equal to the count in all_ids.

```
complete_index_mapping = SELECT a.index,
    CASE WHEN a.cnt = b.cnt
    THEN a.index
    ELSE locks_seq_dim.nextval END new_index
  FROM :member_indices a
  JOIN :all_indices b ON a.index = b.index:
index_mapping = SELECT index, new_index
  FROM :complete_index_mapping
  WHERE index != new_index;
```

This complete index mapping, which also includes indices mapped to themselves, is needed for the result value. For the actual update however, only the changed indices are needed.

Now that we have the requisite information, the updated members and additional lock entries can be computed and applied to the index table and the locks table.

```
new_members = SELECT a.member. b.new_index index
  FROM :members a
  JOIN :index_mapping b ON a.index = b.index;
REPLACE locks_index_dim SELECT member, index FROM
:new_members;
new_locks = SELECT a.new_index index_dim, b.index_dim1,
    b.index_dim2, ..., b.index_dimN. b.state
  JOIN :members a
  JOIN locks b ON a.index = b.index;
INSERT INTO locks
  SELECT index_dim, index_dim1.
    index_dim2, ..., index_dimN, state
  FROM :new_locks;
```

The result table containing all new indices can be computed by this query:

```
SELECT new_index index FROM :complete_id_mapping;
```

The same algorithm can be used for every other dimension by using the index table and sequence for this dimension and by adapting the new locks query and the INSERT statement.

In some embodiments, the complete UPDATE algorithm first executes the SPLITALL procedure described above for each dimension, remembering the result tables, and finally updating the lock state. Assuming that the dimensions are named dim1, dim2, . . . , dimN, the result tables are named is_dim1, is_dim2, . . . , is dimN, the new state is stored in a variable new state, and the default lock state is stored in a variable default_state. The last part can be implemented as follows:

```
IF new_state = default_state THEN
  DELETE FROM locks
    WHERE index_dim1 IN (SELECT * FROM :is_dim1)
    AND index_dim2 IN (SELECT * FROM : is_dim2)
    AND ...
    AND index_dimN IN (SELECT * FROM :is_dimN);
ELSE
  UPSERT locks
    SELECT is_dim1.index index_dim1,
      is_dim2.index index_dim2, ...,
      is_dimN.index index_dimN, :new_state state
    FROM is_dim1, is_dim2, ..., is_dimN;
END IF;
```

Figure 11:
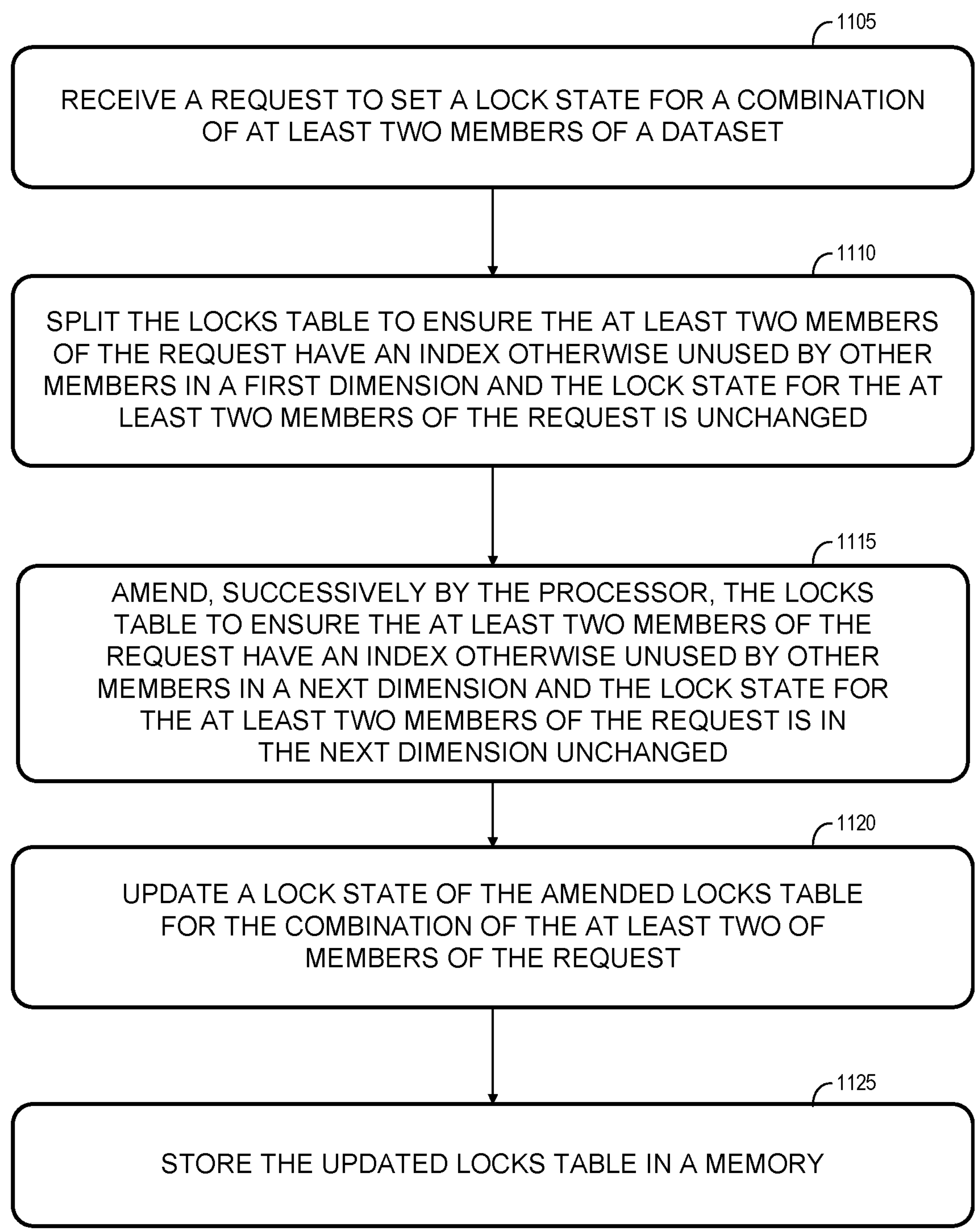
FIG. 11 is a flow diagram of a process in an example embodiment.

FIG. 11 is an illustrative flow diagram of an UPDATE process herein leveraging the index tables and locks table also disclosed herein. Process 1100 may be invoked or called to set lock state(s) for some combination of members of a dataset. At operation 1105, a request is received to set a lock state for a combination of at least two members of the dataset. internally to the UPDATE process, the locks table for the dataset is split on the dimensions of the members in the combination at operation 1110. The splitting operation is to ensure that the members of the request have an index that is otherwise unused by other members of the operation of the particular dimension associated with the subject members. It is noted that the splitting operation does not change the lock state of the subject members.

Advancing to operation 1115, the locks table is successively amended for all of the other dimensions associated with the members in the combination of the UPDATE request to ensure that the members have an index that is otherwise unused by other members in all of the other dimensions.

At operation 1120, a lock state for the locks table amended as determined by operations 1110 and 1115 is updated (i.e., changed) per the UPDATE request. The splitting operations used by process 1100 effectively isolate the indices of the members of the UPDATE request so that they alone are efficiently changed or set as requested, without changing the lock states of other members. Operation 1125 includes a provision for storing the updated locks table in a memory, where it can be accessed by other processing operations.

In some aspects, the QUERY and UPDATE operations disclosed hereinabove may be improved upon by one or more optimizations. One optimization may include not generating unused indices. If $SPLIT_d$ is called with a set of members u and an index i so that no other members have index i, no members will have index i after the call. All entries in the locks table referring to i are then useless to describe the state function. Over time, more and more of these useless entries would accumulate.

To prevent this, $SPLIT_d$ has to detect if the index i is only used by members in u. If that is the case, neither members nor locks have to be updated (i.e., no new index assignments) and the index i can be reused instead of generating a fresh index. In one embodiment, this feature may be implemented in accordance with the following $SPLIT_d$ algorithm with unused indices detection.

```
function SPLIT_d(u, i)
  if ∀m : I_d(m) = i ⟹ m ∈ u then
    return i
  else
    i' ← FRESH_d
    for all m ∈ u do
      if I_d(m) = i then
        I_d(m) ← i'
      end if
    end for
    for all t ∈ LOCKS_d(i) do
      L(t[d/i']) ← L(t)
    end for
    return i'
  end if
end function
```

After multiple calls to UPDATE, more distinct indices for a dimension could be being used to describe the state function than are necessary. An optimization to avoid redundant slices can be used in some embodiments. In general, multiple indices can be merged into one index, when they can be used interchangeably in the locks table (i.e. they describe the same information regarding lock states and other dimensions). Formally, for each dimension d∈D, an equivalence relation $\sim_d \subseteq \mathbb{N} \times \mathbb{N}$ can be defined over indices the following way:

$$i_1 \sim_d i_2 :\Longleftrightarrow \forall\, t \in \prod_{d' \in D} \mathbb{N} : L(t[d/i_1]) = L(t[d/i_2]).$$

If we have indices $i_1$, $i_2$ for some dimension d ED such that $i_1 \sim_d i_2$, they can be combined into one index i* without changing the state function. The index i* can be equal to $i_1$ or $i_2$ but must otherwise be unused for d. This aspect can be implemented by a $COMBINE_d$ algorithm, that combines $i_1$ and $i_2$ into one index $i^*=\min\{i_1, i_2\}$, as outlined below.

```
procedure COMBINE_d(i_1, i_2)
  for all m ∈ M_d do
    if I_d(m) = max{i_1, i_2} then
      I_d(m) ← min{i_1, i_2}
    end if
  end for
  for all t ∈ LOCKS_d(max{i_1, i_2}) do
    L(t) ← undefined
  end for
end procedure
```

To check whether $i_1 \sim i_2$ holds, a $ISEQUIV_d$ function can be used. To get an intuition, for every lock $t^1 \in LOCKS_d(i_1)$ there must be a lock $t^2 \in LOCKS_d(i_2)$ such that $t^1$ and $t^2$ agree on all dimensions except d, and vice-versa. The $ISEQUIV_d$ function can be defined as follows.

```
function ISEQUIV_d(i1, i2)
  if |LOCKS_d(i1)| ≠ |LOCKS_d(i2)| then
    return ⊥
  else
    r ← ⊤
    for all t1 ∈ LOCKS_d(i1) do
      f ← ⊥
      for all t2 ∈ LOCKS_d(i2) do
        if t1 = t2[d/t_d1] then,
          f ← ⊤
        end if
      end for
      r ← r ∧ f
    end for
    return r
  end if
end function
```

The algorithms $COMBINE_d$ and $ISEQUIV_d$ can be used to implement a $REDUCE_d$ algorithm that operates to combine indices of dimension d as much as possible. The $REDUCE_d$ algorithm can be defined as follows.

```
procedure REDUCE_d(x)
  for all i1 ∈ INDICES_d(M_d) do
    for all i2 ∈ INDICES_d(M_d) do
      if i1 < i2 ∧ ISEQUIV_d(i1, i2) then
        COMBINE_d(i1, i2)
      end if
    end for
  end for
end procedure
```

If $REDUCE_d$ is used directly after UPDATE, it can be further improved by only checking these pairs of indices for equivalence, for which either $i_1 \in is_d$ or $i_2 \in is_d$, where $is_d$ is the set of indices returned by the calls to $SPLIT_d$ during UPDATE.

Another optimization may relate to a default lock state. In particular, a locks table can be reduced by removing all entries that map to a default lock state $s_{def}$ (as discussed above in connection with the UPDATE operation example and table 905 in FIG. 9). Implicitly, if no entry is found for a given tuple, the default lock state is assumed. For this aspect, the QUERY algorithm has to be adapted to accommodate a default state. Accordingly,

```
function QUERY(t)
  t' ← ( )
  for all d ∈ D do
    t_d' ← I_d(t_d)
  end for
  result ← L(t')
  if result is defined then
    return result
  else
    return s_def
  end if
end function
```

Similarly, the UPDATE_LOCK function has to be extended for the default state. If the given lock state equals $S_{def}$, the entries given by the tuple have to be removed. Otherwise, entries have to be created if necessary. An UPDATE_LOCK algorithm extended for a default lock state can be defined as follows,

```
procedure UPDATE_LOCK(t, s)
  if s = s_def ∧ L(t) is defined then
    L(t) ← undefined
  else if s ≠ s_def then
    L(t) ← s
  end if
end procedure
```

In the UPDATE_LOCK algorithm above, the second assignment performs an update or an insert and the first one removes the entry. It is noted that further changes are not necessary. In particular, $SPLIT_d$ needs no adaptation. The initial entry of the locks table (i.e., where every dimension gets index 1 and the locks table contains a single entry that maps the tuple with 1 for every dimension to a default lock state $s_{def}$) can be removed.

Regarding a default index, it is noted that similar to the default lock state, the index tables can be reduced by only considering members that have an index different from a default index $i_{def}$ assigned. This requires an adaption of QUERY, $INDICES_d$, and $SPLIT_d$ by considering the value of $I_d(m)$ to be $i_{def}$, if it is undefined.

In some embodiments the REDUCE function herein is used to optimize a locks table after the UPDATE function, as disclosed hereinabove. As an example of a REDUCE function, operation or process herein, consider the initial locks table as shown in FIG. 3 and referenced generally by reference numeral 300. It is noted that rows 1 and 2 are identical except for row 1 refers to countries with index 1 and row 2 refers to countries with index 2. However, neither index 1 or index 2 are used by any other Country index locks. Logically, for locks table 300, it does not matter whether the Country index is 1 or 2. Therefore, rows 1 and 2 can be merged into one index (e.g., 1). In this example, index 1 is assigned to Germany (previously index 2, as illustrated in FIG. 1, Country index table 235). FIG. 12 is an illustrative depiction of the Country index with the new index 1 for Germany.

Now that the index for Germany is assigned the index 1, all locks referring to the Country index 2 can be deleted. For the present example, the relevant rows are limited to row 2 of locks table 300 in FIG. 2. The locks table with the removed row 2 is shown in FIG. 13. As seen, the lock state of all combinations remain unchanged. However, the number of locks needed to fully and accurately represent the lock states has been reduced. Accordingly, the amount of storage resources required to store the locks table can be correspondingly reduced.

As another slightly bigger and more complex example of the REDUCE function herein, consider the locks table 1405 shown in FIG. 14. Referring to FIG. 14, it is noted that for each row with Country index 1 (i.e., rows 1, 2, and 3), there is another row having the same index values except the Country index is 2 (e.g., rows 4, 5, and 6). That is, there are pairs of duplicate rows in locks table 1405 for the Country index, including rows (1 and 6), (2 and 5), and (3 and 4).

Hereto, we check if indices 1 and 2 can be merged for the Country dimension. Index 1 is used for the first three locks (i.e., rows 1-3) and index 2 is used for the last three locks (i.e., rows 4-6). These two groups are identical except for the differing Country index where row 1 matches with row 6, row 2 matches with row 5, and row 3 matches with row 4. Accordingly, these matching rows can be combined by assigning index 1 to Germany and deleting rows 4, 5, and 6.

Furthermore, in this example Product indices 1 and 2 can be merged since row 1 matches with row 2 and row 6 matches with row 5, except for the Product indices in those rows. Then, the product with index 2 (not present in the initial example) can be assigned index 1 and rows 2 and 5 in locks table 1405 can be deleted.

Therefore, in this latest example, rows 2, 4, 5, and 6 can be deleted based on the redundant indices for the Country index and the Product index. Both reductions (for Country and Product) can be done in any order. No other reductions are seen for locks table 1405.

In some embodiments, the REDUCE process does this check for every pair of indices for each dimension. It first counts for how many locks each index is used and then for each pair with an equal count checks if the actual locks match.

FIG. 15 is an illustrative flow diagram of a REDUCE process herein leveraging the index tables and locks table also disclosed herein. Process 1500 may be invoked or called to optimize the size of the locks table after calls of the UPDATE function herein. At operation 1505, a determination is made, for a locks table specifying one of a fixed plurality of lock states for different combinations of a plurality of members each having an index and belonging to a fixed number of dimensions of a dataset, whether there are duplicate pairs of indices for pairs of the different member combinations. The index pairs are said to be duplicates if the hav the same indices except for a particular dimension index.

At operation 1510, in the instance duplicate pairs of indices for pairs of member combinations are determined at operation 1505, the exceptional (i.e., differing) indices for the particular dimension are combined so that they are the same. In some instances, the first (second) index is changed to the match the second (first) index of the pair.

At operation 1515, the locks table is updated based on the combined indices. Updating of the locks table as disclosed herein with the REDUCE function can effectively and efficiently reduce the size of the locks, while fully and accurately maintaining the lock states of the data in the dataset.

Operation 1520 includes a provision for storing the updated locks table in a memory, where it can be accessed by other processing operations.

In some instances, the REDUCE algorithm may be implemented with a series of SQL statements for each dimension. Again, similar to other procedures herein, it is assumed that the dimension we want to reduce is named dim and all other dimensions are named dim1, dim2, . . . , dimN.

For each pair of indices used by the dimension, all entries in the lock table are compared that reference the first index of the pair, with all entries that reference the second index of the pair. Since this can be expensive process, an initial selection is performed by only counting how many entries refer to a given index and then only considering these pairs of indices, for which both indices have the same count.

All counts can be queried as follows:

```
counts = SELECT index_dim index, count(*) cnt
  FROM locks
  GROUP BY index_dim;
```

Next, a list of potential pairs of indices can be determined by comparing the count. Since the order of a pair does not matter, only pairs for which the first index is less that the second index need be considered. This can be accomplished by the following.

```
candidates = SELECT a.index index1, b.index index2 a.cnt
  FROM :counts a
  JOIN :counts b ON a.cnt = b.cnt AND a.index < b.index;
```

From all potential pairs, the pairs that are actual matches can be determined (i.e., where the indices are equivalent, as discussed hereinabove) and implemented as shown below.

```
matches = SELECT index1, index2
  FROM :candidates c
  WHERE cnt IN
    (SELECT count(*)
      FROM locks a
      JOIN locks b ON a.index_dim1 = b.Index_dim1
        AND a.index_dim2 = b.index_dim2
        AND ...
        AND a.index_dimN = b.index_dimN
        AND a.state = b.state
        AND b.index_dim = c.index2
      WHERE a.index_dim = c.index1);
```

This joins the entries in the lock table that refer to the first index of the candidate pair with the entries referring to the second index of the pair on all other columns. The number of these joined entries only equals to the number of locks referring to the first index if all of them are equal on all columns except index dim. Otherwise there would be a mismatch in the condition of the join and less entries would emerge.

This table of matching pairs also contains transitive entries. For example, if index 1 is equivalent to index 2 and index 2 is equivalent to index 3, candidates would contain the pairs (1, 2), (1, 3), (2, 3). The last pair is not needed, since when later index 2 and 3 are merged into index 1, there is no need to also merge index 3 into index 2 since neither of them are used anymore at this point. That is, all indices that have 2 or 3, get index 1 and all locks for 2 and 3 can be removed because they are subsumed by the locks for index 1. This process is repeated for every dimension to reduce the size of the locks table. Accordingly, the matching pairs can be reduced in the following manner.

```
reduced = SELECT min(index1) index1, index2
  FROM :matches
  GROUP BY index2;
```

Then, the second index of each pair can be merged into the first index. For this aspect, the updated entries in the index table are computed and the index and locks tables are updated. New member entities can be computed by setting the new index for these members and deleting locks for the now unused indices. The following is an example SQL implementation of these aspects.

```
new_members = SELECT a.member, b.index1 index
  FROM locks_index_dim a
  JOIN :reduced b ON a.index = b.index2;
REPLACE locks_index_dim SELECT member. index FROM
:new_members;
DELETE FROM locks WHERE index_dim IN (SELECT index2
FROM :reduced);
```

If the above statement is executed immediately after an UPDATE, the algorithm can be improved by only considering pairs of indices, for which one index was touched by the update, i.e. is included in the is_dim table.

Figure 16:
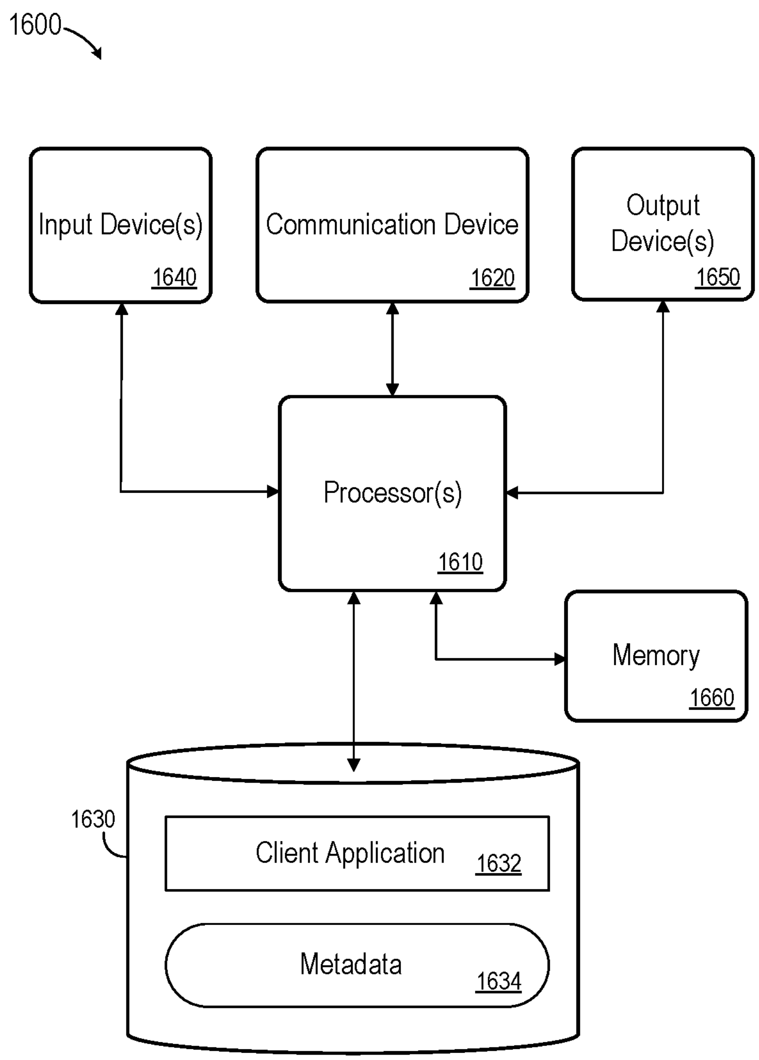
FIG. 16 is a block diagram of an apparatus in an example embodiment.

FIG. 16 is a block diagram of computing system 1600 according to some embodiments. System 1600 may comprise a general-purpose computing apparatus and may execute program code to perform any of the functions described herein. System 1600 may comprise an implementation of data server 105, including data locking module 125, as described above. System 1600 may include other unshown elements according to some embodiments.

System 1600 includes processor(s) 1610 operatively coupled to communication device 1620, data storage device 1630, one or more input devices 1640, one or more output devices 1650 and memory 1660. Communication device 1620 may facilitate communication with external devices, such as a data server. Input device(s) 1640 may comprise, for example, a keyboard, a keypad, a mouse or other pointing device, a microphone, knob or a switch, an infra-red (IR) port, a docking station, and/or a touch screen. Input device(s) 1640 may be used, for example, to enter information into system 1600. Output device(s) 1650 may comprise, for example, a display (e.g., a display screen) a speaker, and/or a printer.

Data storage device 1630 may comprise any appropriate persistent storage device, including combinations of magnetic storage devices (e.g., magnetic tape, hard disk drives and flash memory), optical storage devices, Read Only Memory (ROM) devices, etc., while memory 1660 may comprise Random Access Memory (RAM), Storage Class Memory (SCM) or any other fast-access memory.

Data locking engine 1632 may comprise program code executed by processor 1610 (and within the execution engine) to cause system 1600 to perform any one or more of the processes described herein (e.g., QUERY, UPDATE, and REDUCE processes). Embodiments are not limited to execution by a single apparatus. Dataset 1634 may comprise index tables and a locks table for the dataset, according to some embodiments. Data storage device 1630 may also store data and other program code for providing additional functionality and/or which are necessary for operation of system 1600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method to update a locks table for a dataset, the method comprising:

receiving, by a processor, a request to set a lock state for a combination of at least two members of a dataset, the dataset including database data tables including a fixed plurality of dimensions each having a fixed plurality of members and a locks table specifying one of a fixed plurality of lock states for different combinations of the plurality of members of the dataset, and the fixed plurality of members each having an associated index value defined by a database index table for each of the plurality of dimensions;

splitting, by the processor, a first dimension of the combination of the members of the request to ensure each of the members in the combination of the request have a unique index value in the locks table relative other members in the first dimension by determining whether the members in the combination of the request in the first dimension have an index value shared with the other members in the first dimension and assigning the unique index value to the members in the combination of the request in the first dimension in an instance the index value is shared and updating the locks table with the unique index value assigned to the members of the first dimension, the lock state for the at least two members of the request is unchanged;

amending, by the processor, the locks table by successively splitting each of the dimensions other than the first dimension of the members of the combination of the request to ensure the members of the request in each of the dimensions other than the first dimension have a unique index value relative other members in each of the dimensions other than the first dimension and the lock state for the at least two members of the request is unchanged;

updating, by the processor in response to a conclusion of the successive amending of the locks table, a lock state of the amended locks table for the combination of the at least two of members of the request; and storing the updated locks table in a memory.

2. The method of claim 1, wherein the successive amending is executed for all of the fixed plurality of dimensions.

3. The method of claim 2, wherein the lock state is unchanged for each of the members of the plurality of dimensions.

4. A computing system to update a locks table for a dataset, the system comprising:

a storage device a dataset, the dataset including database data tables including a fixed plurality of dimensions each having a fixed plurality of members and a locks table specifying one of a fixed plurality of lock states for different combinations of the plurality of members of the dataset, and the fixed plurality of members each having an associated index value defined by a database index table for each of the plurality of dimensions;

a memory storing processor-executable program code; and a processor to execute the processor-executable program code in order to cause the computing system to:

receive a request to set a lock state for a combination of at least two members of the dataset;

split a first dimension of the combination of the members of the request to ensure each of the members in the combination of the request have a unique index value in the locks table relative other members in the first dimension by determining whether the members in the combination of the request in the first dimension have an index value shared with the other members in the first dimension and assigning the unique index value to the members in the combination of the request in the first dimension in an instance the index value is shared and updating the locks table with the unique index value assigned to the members of the first dimension, the lock state for the at least two members of the request is unchanged;

amend, the locks table by successively splitting each of the dimensions other than the first dimension of the members of the combination of the request to ensure the members of the request in each of the dimensions other than the first dimension have a unique index value relative other members in each of the dimensions other than the first dimension and the lock state for the at least two members of the request is unchanged;

update, in response to a conclusion of the successive amending of the locks table, a lock state of the amended locks table for the combination of the at least two of members of the request; and store the updated locks table in a memory.

5. The system of claim 4, wherein the successive amending is executed for all of the fixed plurality of dimensions.

6. The system of claim 5, wherein the lock state is unchanged for each of the members of the plurality of dimensions.

7. A non-transitory computer readable medium having executable instructions stored thereon, that when executed by a processor, cause the processor to:

receive a request to set a lock state for a combination of at least two members of a dataset, the dataset including database data tables including a fixed plurality of dimensions each having a fixed plurality of members and a locks table specifying one of a fixed plurality of lock states for different combinations of the plurality of members of the dataset, and the fixed plurality of members each having an associated index value defined by a database index table for each of the plurality of dimensions;

split a first dimension of the combination of the members of the request to ensure each of the members in the combination of the request have a unique index value in the locks table relative other members in the first dimension by determining whether the members in the combination of the request in the first dimension have an index value shared with the other members in the first dimension and assigning the unique index value to the members in the combination of the request in the first dimension in an instance the index value is shared and updating the locks table with the unique index value assigned to the members of the first dimension, the lock state for the at least two members of the request is unchanged;

amend the locks table by successively splitting each of the dimensions other than the first dimension of the members of the combination of the request to ensure members of the request in each of the dimensions other than the first dimension have a unique index value relative other members in each of the dimensions other than the first dimension and the lock state for the at least two members of the request is unchanged;

update, in response to a conclusion of the successive amending of the locks table, a lock state of the amended locks table for the combination of the at least two of members of the request; and store the updated locks table in a memory.

8. The non-transitory computer readable medium of claim 7, wherein the successive amending is executed for all of the fixed plurality of dimensions.

9. The non-transitory computer readable medium of claim 8, wherein the lock state is unchanged for each of the members of the plurality of dimensions.

* * * * *